J. W. CONDON.
Egg and Cake-Beaters.
No. 140,891.    Patented July 15, 1873.
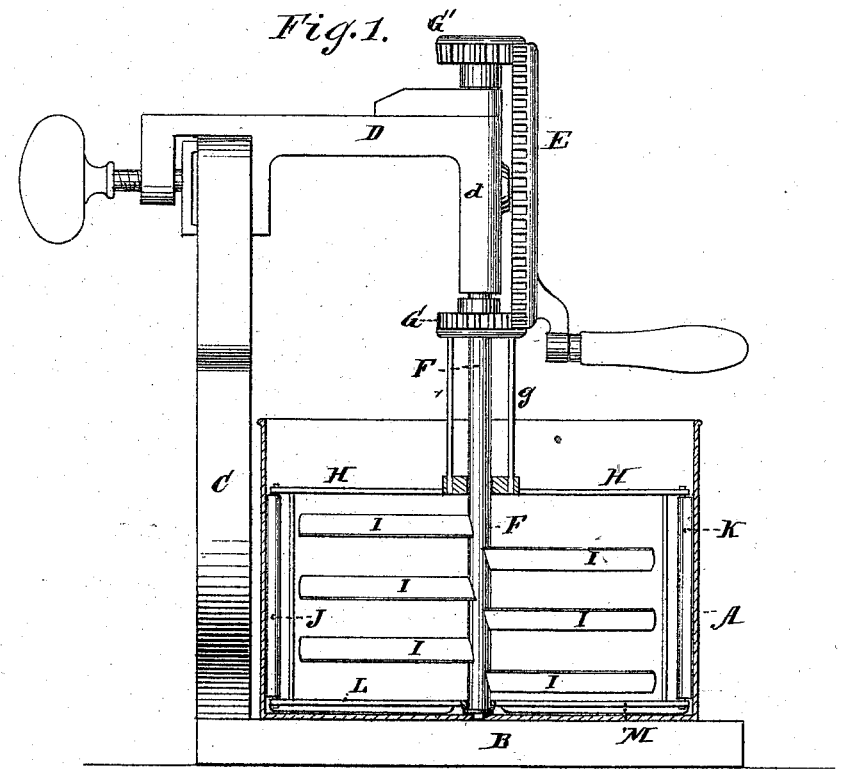
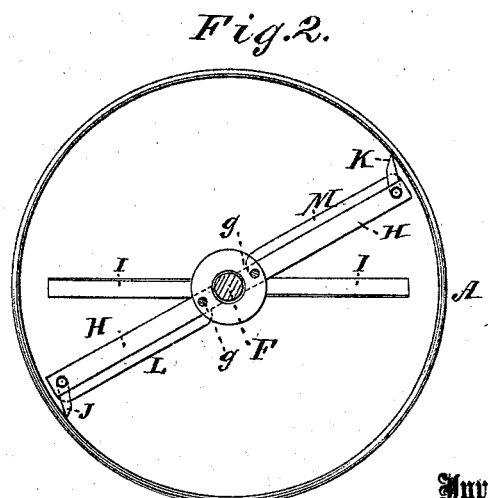
Witnesses:
G. Matthys
John C. Lemon
Inventor:
John W. Condon
per ——— Attorneys.

UNITED STATES PATENT OFFICE.

JOHN W. CONDON, OF LOGANSPORT, INDIANA.

IMPROVEMENT IN EGG AND CAKE BEATERS.

Specification forming part of Letters Patent No. 140,891, dated July 15, 1873; application filed January 3, 1873.

*To all whom it may concern:*

Be it known that I, JOHN W. CONDON, of Logansport, in the county of Cass and State of Indiana, have invented a new and useful Improvement in Egg and Cake Beaters; and I do hereby declare the following to be a full, clear, and exact description of the same, reference being had to the accompanying drawing forming a part of this specification.

It consists in the means for operating the beaters and scrapers, substantially as hereinafter described and claimed.

In the drawing, Figure 1 is a side elevation, and Fig. 2 is a top view.

A in the drawing represents a vessel in which the egg or cake batter is placed; B, the platform to which it is attached; C, an upright; D, an arm clamped thereto; and E, a crank crown-wheel pivoted to a projection, $d$. F is a shaft journaled in projection $d$ of arm D, and in bearing on bottom of cup, while it is provided with pinions G G' that mesh into the teeth of crown-wheel E, on opposite sides thereof. To the pinion G is attached, by rods $g\ g$, a frame, H, which may thus be rotated in one direction around the shaft F, while the shaft itself is rotated in the opposite direction by pinion G'. On opposite sides of the shaft F are fixed radial paddles or beaters, I, preferably placed obliquely to a horizontal plane, while on the sides and bottom of frame H are fastened scrapers J K and L M, respectively. These scrapers are preferably made of wood, and are reversed on opposite sides of the shaft.

The operation is as follows: The paddles rotate and beat up the adhesive liquid in one direction, while the scrapers, rotating in the opposite direction, scrape off any material that lodges on bottom or sides, and throw it directly into the path of the beaters.

Having thus described my invention, what I claim as new, and desire to secure by Letters Patent, is—

The means described for operating the beaters and scrapers I in opposite directions, consisting of the frame H, rods $g\ g$, pinion G G', shaft F, and crank-wheel E, arranged as set forth.

JOHN W. CONDON.

Witnesses:
J. H. CHAPPELON,
W. G. CHAPPELON.